United States Patent
Doyle et al.

(10) Patent No.: US 10,376,020 B1
(45) Date of Patent: Aug. 13, 2019

(54) REDUNDANT RETENTION OF A REMOVABLE DEVICE

(71) Applicant: Mars, Incorporated, McLean, VA (US)

(72) Inventors: Thomas F. Doyle, San Diego, CA (US); James C. Brailean, San Diego, CA (US)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 14/988,591

(22) Filed: Jan. 5, 2016

Related U.S. Application Data

(60) Provisional application No. 62/099,969, filed on Jan. 5, 2015.

(51) Int. Cl.
    *A47G 1/10*     (2006.01)
    *A44B 11/25*     (2006.01)
    *A44B 11/28*     (2006.01)
    *A01K 27/00*     (2006.01)

(52) U.S. Cl.
    CPC ............ *A44B 11/25* (2013.01); *A01K 27/001* (2013.01); *A01K 27/008* (2013.01); *A44B 11/28* (2013.01)

(58) Field of Classification Search
    USPC ...................................................... 248/316.1
    See application file for complete search history.

(56) References Cited

U.S. PATENT DOCUMENTS

| | | | |
|---|---|---|---|
| 1,754,200 A | 4/1930 | Janes | |
| 1,839,896 A | 1/1932 | Theodore | |
| 2,873,082 A * | 2/1959 | Gillespie | F16L 32/241 248/300 |
| 3,477,409 A | 11/1969 | Costanzo | |
| 3,782,017 A | 1/1974 | Graham | |

(Continued)

FOREIGN PATENT DOCUMENTS

| | | |
|---|---|---|
| DE | 202005013615 U1 | 11/2005 |
| JP | 1602690 S | 4/2017 |

OTHER PUBLICATIONS

Whistle Fit, published 2018 [online], [retrieved on Jul. 17, 2018], Available from internet, URL: <https://www.petinsight.com/whistle-fit/>, 5 pgs.

(Continued)

*Primary Examiner* — Monica E Millner
(74) *Attorney, Agent, or Firm* — Greenberg Traurig, LLP

(57) ABSTRACT

An apparatus for redundant retention of a device comprises a mountable device comprising a first side having a first fastening portion and a second fastening portion, at the first fastening portion, an elongated body having an inclined face parallel to and protruding from the first side and a flat face perpendicular to the first side, at the second fastening portion, a circular body with a smooth circular face, the circular body protruding from the first side, a removable device comprising a corresponding first side having a corresponding first fastening portion and a corresponding second fastening portion, at the corresponding first fastening portion, a first groove for receiving the elongated body and engaging a first retention mechanism, at the corresponding second fastening portion, a second groove for receiving the circular body and engaging a second retention mechanism.

11 Claims, 6 Drawing Sheets

(56) References Cited

U.S. PATENT DOCUMENTS

| | | | |
|---|---|---|---|
| D242,675 S | 12/1976 | McNair | |
| 4,208,986 A | 6/1980 | Costanzo | |
| 4,318,234 A | 3/1982 | Charles et al. | |
| 4,566,865 A * | 1/1986 | Nishitsuji | F04B 39/127 248/300 |
| 4,742,503 A | 5/1988 | Braun et al. | |
| 4,809,700 A | 3/1989 | Castelli et al. | |
| D300,678 S | 4/1989 | Barrault | |
| 4,821,424 A | 4/1989 | Loggins | |
| 4,940,020 A | 7/1990 | Gordon | |
| D337,411 S | 7/1993 | Smith | |
| D349,864 S | 8/1994 | Dunlap et al. | |
| 5,473,830 A | 12/1995 | Doble | |
| 5,553,820 A * | 9/1996 | Karten | A47B 21/0314 248/181.2 |
| 5,603,094 A | 2/1997 | Greear | |
| 5,623,731 A | 4/1997 | Ehrgott et al. | |
| D410,206 S | 5/1999 | Slater | |
| 6,202,599 B1 | 3/2001 | Cutler | |
| 6,314,058 B1 | 11/2001 | Lee | |
| D454,991 S | 3/2002 | Muller | |
| D460,221 S | 7/2002 | Sloot | |
| D464,941 S | 10/2002 | Latto et al. | |
| D478,830 S | 8/2003 | So | |
| 6,695,269 B1 | 2/2004 | Anscher | |
| 6,720,879 B2 | 4/2004 | Edwards | |
| 6,805,460 B1 | 10/2004 | Zoller et al. | |
| 6,966,533 B1 * | 11/2005 | Kalis | B60R 11/0241 248/279.1 |
| D521,927 S | 5/2006 | Franck et al. | |
| D524,282 S | 7/2006 | Beasley et al. | |
| 7,140,989 B2 | 11/2006 | Poruchny | |
| D535,281 S | 1/2007 | Yang | |
| D537,409 S | 2/2007 | Suzuki | |
| D558,209 S | 12/2007 | Ikeda et al. | |
| D565,182 S | 3/2008 | Cheng et al. | |
| 7,341,561 B2 | 3/2008 | Tanaka et al. | |
| D575,289 S | 8/2008 | Kuo et al. | |
| D584,176 S | 1/2009 | Maruyama et al. | |
| D591,012 S | 4/2009 | Geissler | |
| D592,647 S | 5/2009 | L'Henaff et al. | |
| D594,404 S | 6/2009 | Kuo et al. | |
| D594,874 S | 6/2009 | Sheba et al. | |
| D597,676 S | 8/2009 | Copeland et al. | |
| D599,241 S | 9/2009 | Andre et al. | |
| D608,277 S | 1/2010 | Cano et al. | |
| D609,636 S | 2/2010 | Jensen | |
| 7,705,736 B1 | 4/2010 | Kedziora | |
| D618,802 S | 6/2010 | Brady et al. | |
| D619,256 S | 7/2010 | Brady et al. | |
| D625,262 S | 10/2010 | Lee et al. | |
| D627,718 S | 11/2010 | Houghton | |
| 7,823,844 B2 * | 11/2010 | Carnevali | B25B 5/02 108/143 |
| 8,091,850 B2 * | 1/2012 | Carnevali | B25B 5/02 248/176.1 |
| D656,096 S | 3/2012 | Sasada et al. | |
| D657,274 S | 4/2012 | Neethling | |
| D663,684 S | 7/2012 | Yang | |
| D663,685 S | 7/2012 | Yang | |
| 8,240,628 B2 * | 8/2012 | Huang | F16M 11/041 248/122.1 |
| D667,322 S | 9/2012 | Madrack | |
| D668,562 S | 10/2012 | Madrack | |
| D669,027 S | 10/2012 | Kumpula et al. | |
| D671,921 S | 12/2012 | Beall et al. | |
| D673,110 S | 12/2012 | Sasada et al. | |
| D673,908 S | 1/2013 | Koch | |
| 8,353,603 B2 | 1/2013 | Berry et al. | |
| 8,371,250 B2 | 2/2013 | Konovalov | |
| 8,398,041 B2 * | 3/2013 | Brinkdopke | F16B 45/02 248/316.1 |
| D680,541 S | 4/2013 | Lee et al. | |
| D693,814 S | 11/2013 | Park | |
| D694,228 S | 11/2013 | Richter | |
| 8,616,385 B1 * | 12/2013 | Doran | A63B 1/0036 211/85.7 |
| D698,376 S | 1/2014 | Funato et al. | |
| 8,677,941 B2 | 3/2014 | Yanai et al. | |
| D704,634 S | 5/2014 | Eidelman et al. | |
| 8,720,844 B2 * | 5/2014 | Westimayer | F16M 13/02 248/218.4 |
| D706,321 S | 6/2014 | Oetlinger et al. | |
| D709,396 S | 7/2014 | Eidelman et al. | |
| 8,905,367 B2 * | 12/2014 | Bury | B60R 11/02 224/929 |
| D724,971 S | 3/2015 | Bailey et al. | |
| D725,511 S | 3/2015 | Read et al. | |
| D725,850 S | 3/2015 | Eidelman et al. | |
| D742,817 S | 11/2015 | Lammers-Meis et al. | |
| D744,658 S | 12/2015 | Hilkey-Boyatt | |
| D745,421 S | 12/2015 | Akana et al. | |
| D749,570 S | 2/2016 | Lee | |
| 9,296,340 B2 * | 3/2016 | Ackeret | F16M 11/105 |
| D761,138 S | 7/2016 | Manabe et al. | |
| 9,450,430 B2 * | 9/2016 | Fuller | H02J 7/0044 |
| D769,869 S | 10/2016 | Zhou et al. | |
| D772,745 S | 11/2016 | Henne et al. | |
| D774,651 S | 12/2016 | Kaib et al. | |
| D778,746 S | 2/2017 | Renganathan | |
| D780,238 S | 2/2017 | Kato | |
| 9,587,782 B2 * | 3/2017 | Johnson | F16M 13/022 |
| D784,325 S | 4/2017 | Kim et al. | |
| D788,999 S | 6/2017 | Zinn et al. | |
| D797,100 S | 9/2017 | Wieser et al. | |
| D798,861 S | 10/2017 | Wieser et al. | |
| D800,085 S | 10/2017 | Shepher | |
| D800,721 S | 10/2017 | Kim et al. | |
| 9,861,080 B1 | 1/2018 | Hathway et al. | |
| D812,499 S | 3/2018 | Kuh et al. | |
| D815,061 S | 4/2018 | Wei | |
| D815,077 S | 4/2018 | Sibley et al. | |
| D816,520 S | 5/2018 | Elrod et al. | |
| D819,633 S | 6/2018 | Jun | |
| D828,189 S | 9/2018 | Benedetti | |
| 2002/0010390 A1 | 1/2002 | Guice et al. | |
| 2003/0116101 A1 | 6/2003 | Kim et al. | |
| 2006/0000194 A1 | 1/2006 | Duncan et al. | |
| 2007/0209604 A1 | 9/2007 | Groh et al. | |
| 2007/0221140 A1 | 9/2007 | Warren et al. | |
| 2007/0246637 A1 * | 10/2007 | Ju | G06F 1/20 248/674 |
| 2009/0013939 A1 | 1/2009 | Santiago et al. | |
| 2009/0038670 A1 | 2/2009 | Shu | |
| 2012/0048213 A1 | 3/2012 | Konovalov | |
| 2012/0312936 A1 * | 12/2012 | Huang | F16M 11/041 248/122.1 |
| 2013/0006065 A1 | 1/2013 | Yanai et al. | |
| 2013/0105662 A1 * | 5/2013 | Cote | F16M 11/041 248/689 |
| 2014/0290013 A1 | 10/2014 | Eidelman et al. | |
| 2015/0020751 A1 | 1/2015 | Pattie et al. | |
| 2017/0208775 A1 | 7/2017 | Van Curen et al. | |
| 2018/0098525 A1 | 4/2018 | Lee et al. | |

OTHER PUBLICATIONS

"Amazon.com, Inc. Web page, JPO's Prior Design Ref. No. HJ27044048", Date first available, Oct. 5, 2015, 7 pp.

"Whistle 3 GPS Pet Tracker & Activity, Available for sale Jun. 8, 2007 [online]", Amazon.com, [Retrieved on Jul. 1, 2018], Available from internet URL:<https://www.amazon.com/dp/b01n7mwkwy/ref=sspa_dk_detail_1?pcs=1, 9 pages.

\* cited by examiner

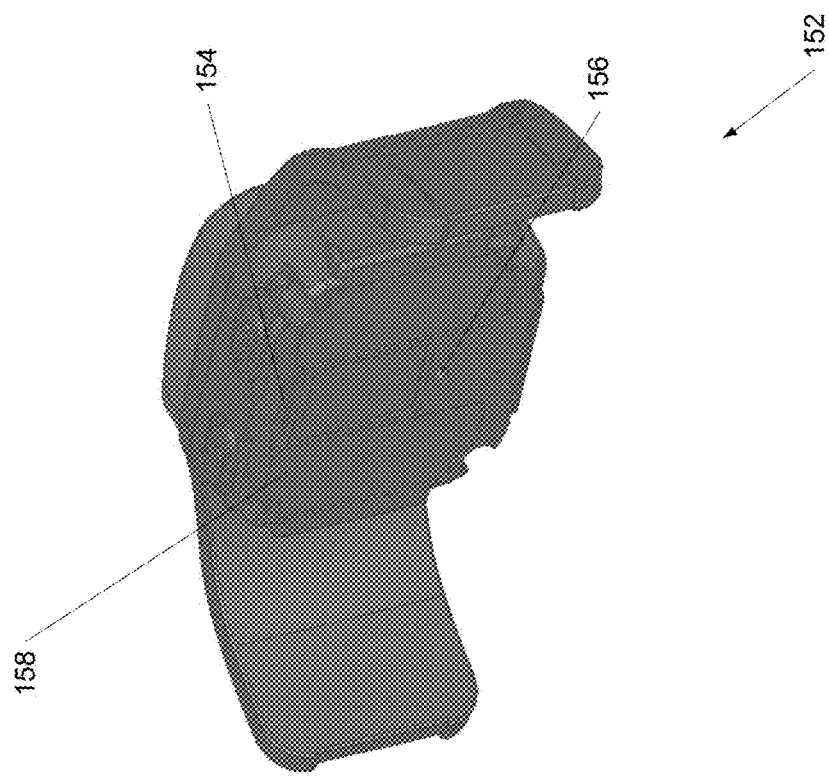
FIG. 1
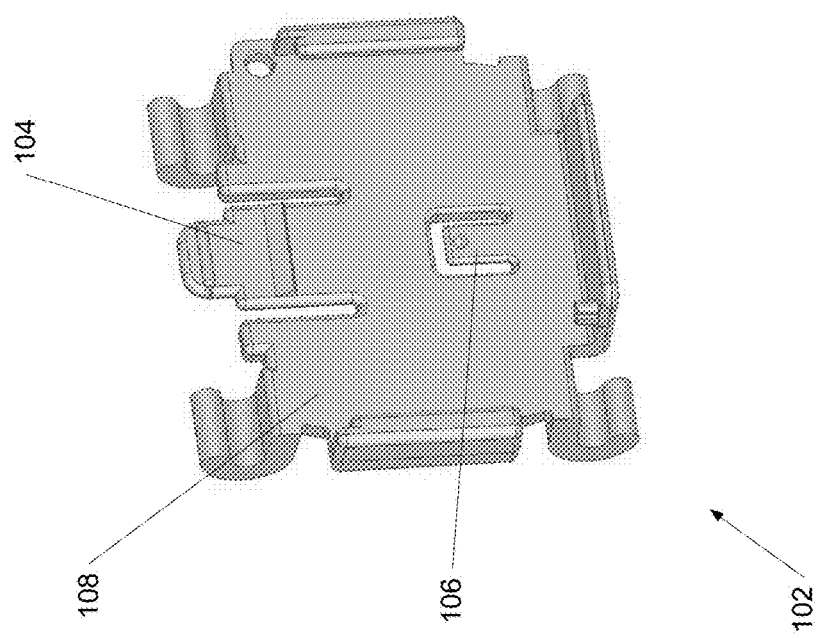

REDUNDANT RETENTION OF A REMOVABLE DEVICE

BENEFIT CLAIM

This application claims the benefit under 35 U.S.C. § 119(e) of provisional application 62/099,969, filed Jan. 5, 2015, the entire contents of which are hereby incorporated by reference for all purposes as if fully set forth herein.

FIELD OF THE DISCLOSURE

The present disclosure generally relates to retention (i.e. locking) mechanisms and more specifically to systems and methods for utilizing redundant retention mechanisms for securely attaching devices.

BACKGROUND

Wearable technology integrates computing devices into clothing and accessories. Such devices can be worn a number of ways such as a specific item of clothing, jewelry, glasses, a specific device, etc. Functions can range from practical to purely esthetic and can include location tracking, health monitoring, motion sensing, and image capturing. This technology can be worn by a wide range of users including (but not limited to) adults, children, babies, and even pets.

Location tracking can be integrated into wearable technology to provide location-based information for a range of applications. Location tracking can be accomplished using a number of methods including the Global Positioning System (GPS), Radio Frequency Identification (RFID), or a Wireless Local Area Network (WLAN). GPS is a space-based satellite navigation system developed in the 1970s by the United States Department of Defense. Devices on earth with a GPS receiver can connect to satellites in space to obtain time and location information. RFID receivers can use small microchips to transmit location data to a RFID reader using a predetermined radio frequency. WLAN technology can use IEEE 802.11 standards to connect two or more computing devices and measures the intensity of a received signal to determine the location of the device transmitting that signal. WLAN is frequently used in locations where GPS signals are blocked.

BRIEF DESCRIPTION OF THE DRAWINGS

FIG. 1 is a diagram illustrating a mountable device and a removable device for an example embodiment.

DETAILED DESCRIPTION OF THE DRAWINGS

Figure 2:
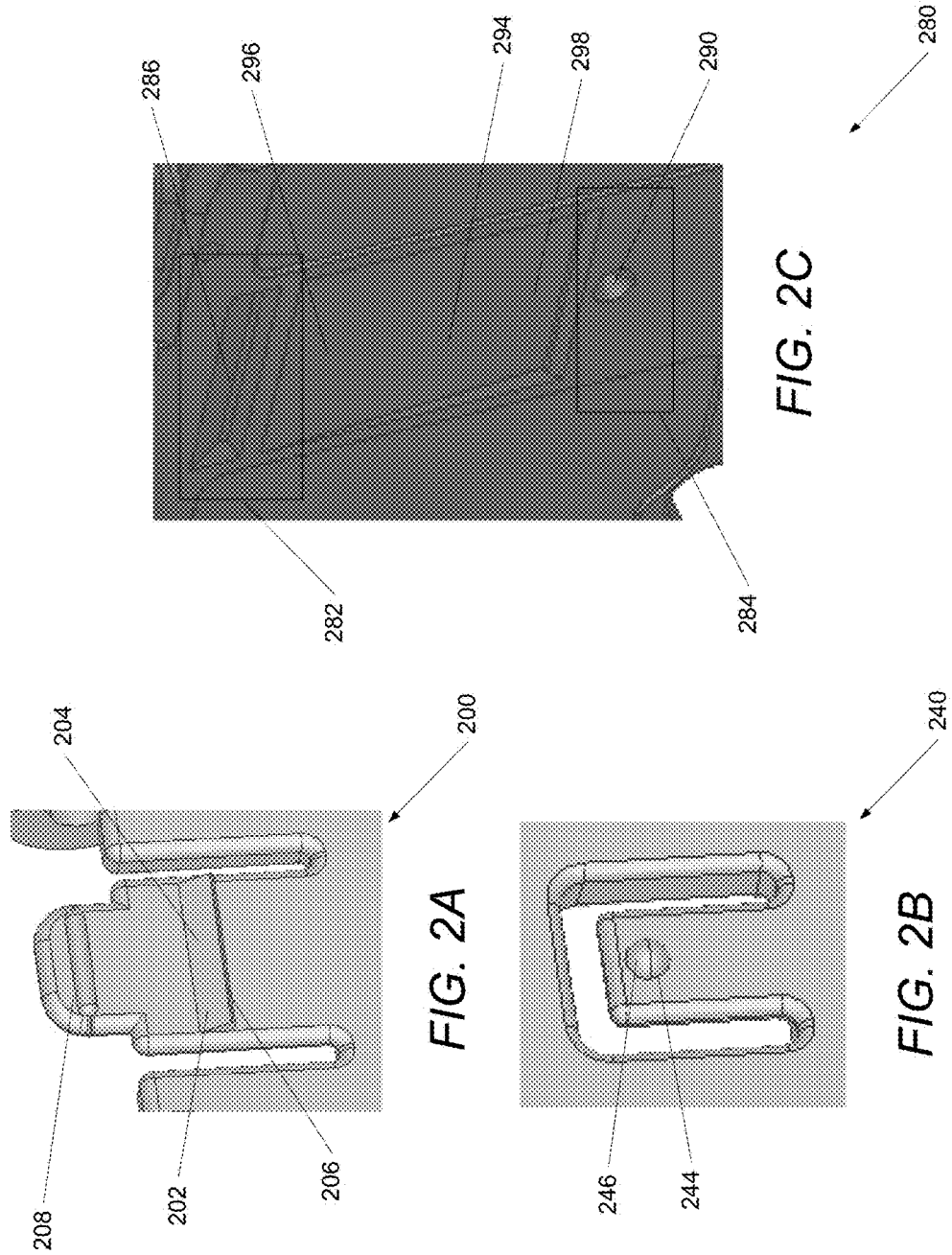
FIG. 2A, FIG. 2B, and FIG. 2C are diagrams illustrating a first fastening portion, a second fastening portion, and corresponding first and second fastening portions, respectively for use in primary and redundant retention mechanisms for an example embodiment.

Turning now to the drawings, redundant retention mechanisms for securely attaching and detaching devices for an example embodiment are illustrated. In many embodiments, a removable device such as (but not limited to) a tracker can be secured to a mountable device utilizing a primary and a redundant retention mechanism. In various embodiments, devices detach by disengaging both the primary retention mechanism and the redundant retention mechanism where the redundant retention mechanism does not disengage unless a force is applied that exceeds a predetermined threshold. In several embodiments, the primary retention mechanism is typically disengaged prior to allowing the redundant retention mechanism to disengage. In a variety of embodiments, the redundant retention mechanism alone can keep a removable device attached to a mountable device even if the primary retention mechanism is disengaged. In many embodiments, the redundant retention mechanism can maintain the positioning of the devices to allow the primary retention mechanism to reengage during inadvertent and/or accidental attempts to detach the devices. In many embodiments, separation of the devices involves application of force to one of the devices while the primary retention mechanism is disengaged. As is discussed further below, the force can be applied to translate the two devices relative to each other and disengage the redundant retention mechanism. In several embodiments, the force can be applied to rotate the two devices relative to each other and disengage the redundant retention mechanism. Redundant retention mechanisms for attaching and detaching devices for an example embodiment are discussed below.

Retention Mechanisms

Location-based tracking systems can include a removable device such as (but not limited to) a tracker that can attach to a mountable device using primary and redundant retention mechanisms. The mountable device in turn can be secured to an object to be tracked, for example by attaching to a pet's collar as further described below.

Primary and redundant retention mechanisms for an example embodiment are shown in FIG. 1. A mountable device 102 can include a first fastening portion 104 that fastens to a corresponding first fastening portion 154 of a removable device 152 to create a primary retention mechanism as further described below. Likewise, the mountable device 102 can also include a second fastening portion 106 that fastens to a corresponding second fastening portion 156 of the removable device to create a redundant retention mechanism as further described below. In many embodiments, the mountable device has a first side 108 that interfaces with a first side 158 of the removable device. In various embodiments, the mountable device 102 can include a second side that attaches to an object to be monitored.

A primary and a redundant retention mechanism for an example embodiment are shown in FIG. 2A, FIG. 2B, and FIG. 2C. As described above, a mountable device can include a first fastening portion 200 as illustrated in FIG. 2A. The first fastening portion can include an elongated body 202 attached to the mountable device having an inclined face 204 that is parallel to and protrudes from the mountable device and a flat face 206 that is perpendicular to the surface of the mountable device. The removable device as illustrated in FIG. 2C can include a corresponding first fastening portion 282 having a first groove 286 for receiving the elongated body 202 to engage the primary retention mechanism.

As illustrated in FIG. 2B, the mountable device can include a second fastening portion 240 having a circular body 244 that protrudes from the mountable device and has a smooth circular face 246. As illustrated in FIG. 2C, the removable device can include a corresponding second fastening portion 284 having a second groove 290 for receiving the circular body 244 to engage the redundant retention mechanism.

In many embodiments, the first fasting portion of the mountable device can also include a tab 208 that can be pushed to temporarily move the first fastening portion away from the mountable device to disengage the primary retention mechanism as further described below. In several embodiments, the second fastening portion 240 can be configured to allow the redundant retention mechanism to engage (or disengage) utilizing force that causes the second fastening portion 240 to bend allowing the circular body 244 to release from the second groove 290.

In various embodiments, the removable device can include a body groove 294 having a declined face that can receive the inclined face 204 of the elongated body 202 and allow it to readily slide away from the first groove 286 when the primary retention mechanism is disengaged or slide towards the first groove 286 to engage the primary retention mechanism. In many embodiments, the body groove 294 can have a shallower end 296 (near the first groove 286) and a deeper end 298 (near the second groove 290) creating the decline face.

In many embodiments, the redundant retention mechanism can have a physical structure similar to the primary retention mechanism (i.e. both the primary and the redundant retention mechanism can have a first and corresponding first fastening portion 104, 154), and the devices typically have traveling (i.e. displacement) between disengaging the primary and redundant retention mechanisms.

Although specific primary and redundant retention mechanisms for attaching and detaching devices are discussed above with respect to FIG. 1 FIG. 2A, FIG. 2B, and FIG. 2C, any of a variety of primary and redundant retention mechanisms as appropriate to the requirements of a specific application can be utilized for an example embodiment. For example, the specific mechanical structures of the illustrated fastening portions can be located on either device. Further, the specific mechanical structures can be directly integrated into an object to be tracked including (but not limited to) a pet collar, a bicycle, or an automobile. In addition, the primary and redundant retention mechanisms can both be locking mechanisms. Furthermore, disengaging the redundant retention mechanism can involve application of forces that result in a translation, rotation and/or combination of translations and/or rotations of the devices relative to each other. Processes for detaching and attaching devices for an example embodiment are discussed further below.

Processes for Detaching and Attaching Redundant Retention Mechanisms

Figure 3:
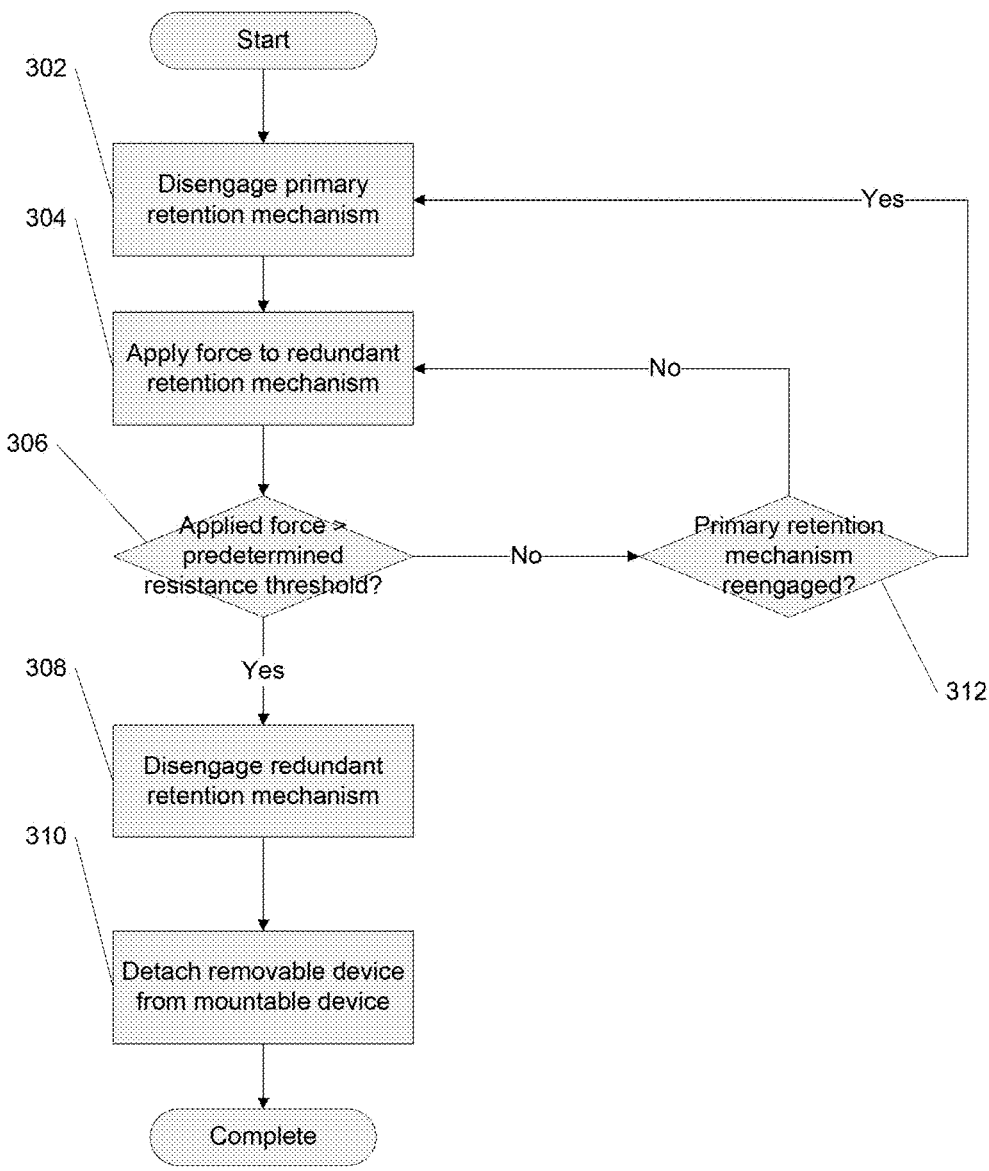
FIG. 3 is a flow chart illustrating a process for detaching a removable device from a mountable device for an example embodiment.

Removable devices can detach from mountable devices when both the primary and redundant retention mechanisms are disengaged. However, the redundant retention mechanism alone can keep the devices attached and maintain the positioning of the devices even if the primary retention mechanism is disengaged. A process for detaching a removable device from a mountable device for an example embodiment is shown in FIG. 3. The process 300 includes disengaging (302) the primary retention mechanism. In many embodiments, a force is applied to the tab 208 of the mountable device in order to displace the elongated body 202 from the first groove 286. Typically, the force can be applied in a direction away from the removable device and can cause the mountable device to flex causing the elongated body 202 to separate from the first groove 286. This can release the first fastening portion 200 from its corresponding first fastening portion 282 to disengage (302) the primary retention mechanism.

The process can also include applying (304) a force to the redundant retention mechanism by sliding the removable device in a direction parallel to the mountable device. In many embodiments, a predetermined resistance threshold created by the circular body 244 fastened to the second groove 290 retains the redundant retention mechanism from disengaging. Thus, the applied force disengages (308) the redundant retention mechanism if it is greater than (306) the predetermined resistance threshold. Thus, if the applied force is greater than (306) the predetermined resistance threshold, the mountable device can flex to release the circular body 244 from the second groove 290. This can release the second fastening portion 240 from the corresponding second fastening portion 284 and disengage (308) the redundant retention mechanism.

If the applied force is less than (or equal to) (306) the predetermined resistance threshold, then the redundant retention mechanism does not disengage and the primary retention mechanism can reengage (312). In many embodiments, the redundant retention mechanism alone can maintain the location of the devices until sufficient force (i.e. force greater than the predetermined resistance threshold) is applied, and displacement has occurred to fully release the devices from the redundant retention mechanism. Typical, this ensures that if the devices are not fully released from the redundant retention mechanism, the primary retention mechanism can consistently reengage. In contrast, if the redundant retention mechanism utilized a mechanism where friction was necessary to slide the device free after disengaging the primary mechanism, then it would be possible for the devices to displace a small amount when the primary retention mechanism was momentarily and/or inadvertently disengaged. In this scenario, the primary retention mechanism might not properly reengage because of the partial displacement of the devices. However, for an example embodiment, the redundant retention mechanism maintains the position of the devices unless the redundant retention mechanism is completely disengaged.

Figure 4:
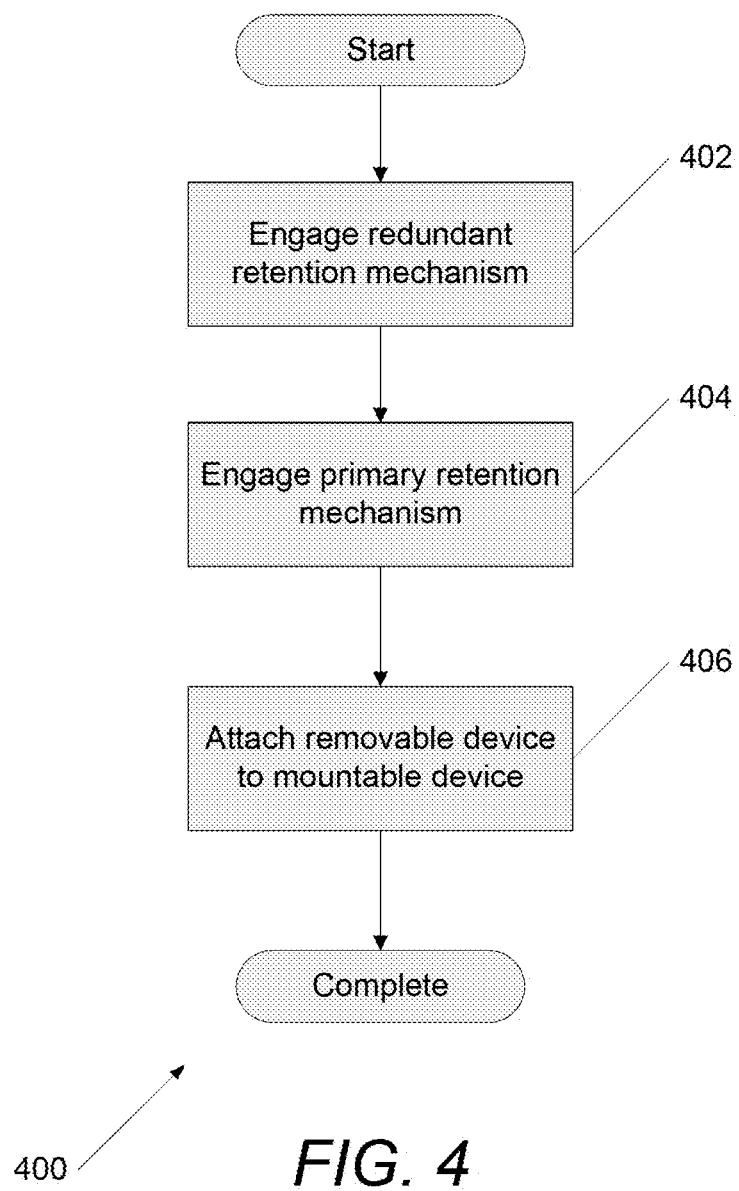
FIG. 4 is a flow chart illustrating a process for attaching a removable device to a mountable device for an example embodiment.

The process for detaching a removable device can further include repeating disengaging (302) the primary retention mechanism when the primary retention mechanism has reengaged (312). However, if the primary retention mechanism does not reengage (312), the process includes applying force to the redundant retention mechanism (304) until the applied force is greater than the predetermined resistance threshold (306). Once both the primary retention mechanism and the redundant retention mechanism are disengaged, the removable device can be detached (310) from the mountable device. A process for attaching a removable device to a mountable device for an example embodiment is shown in FIG. 4. The process 400 includes engaging (402) the redundant retention mechanism by inserting the circular body 244 into the second groove 290 to secure the second fastening portion 240 to its corresponding second fastening portion 284. The process can also include engaging (404) the primary retention mechanism by inserting the elongated body 202 into the first groove 286 to secure the first fastening portion 200 to its corresponding first fastening portion 282. In addition, the body groove 294 can guide the elongated body 202 into position in the first groove 286 as described above. Once the primary and redundant retention mechanisms are engaged, the removable device is attached (406) to the mountable device. Although specific processes for detaching and attaching devices by utilizing primary and redundant retention mechanisms are discussed above with respect to FIG. 3 and FIG. 4, any of a variety of processes for detaching and attaching a removable device to a mountable device utilizing primary and redundant retention mechanisms as appropriate to the requirements of a specific application can be utilized for an example embodiment. For example, forces to attach and detach the devices can be linear and/or rotational depending on the implementation of the primary and redundant retention mechanisms. Thus, in various embodiments, the primary and redundant retention mechanisms can be incorporated as rotational motion embodiments to utilize rotational motion for attaching and detaching as opposed to linear embodiments as described above. Processes for mounting a removable device to items for tracking in accordance with embodiments of the invention are discussed further below.

Mounting Removable Devices for Tracking

Mountable devices can attach to other objects using a retention structure. For example, a mountable device can be secured to a pet collar using a retention structure and a removable device such as a tracker can then be mounted to the pet collar using the mountable device.

Figure 5:
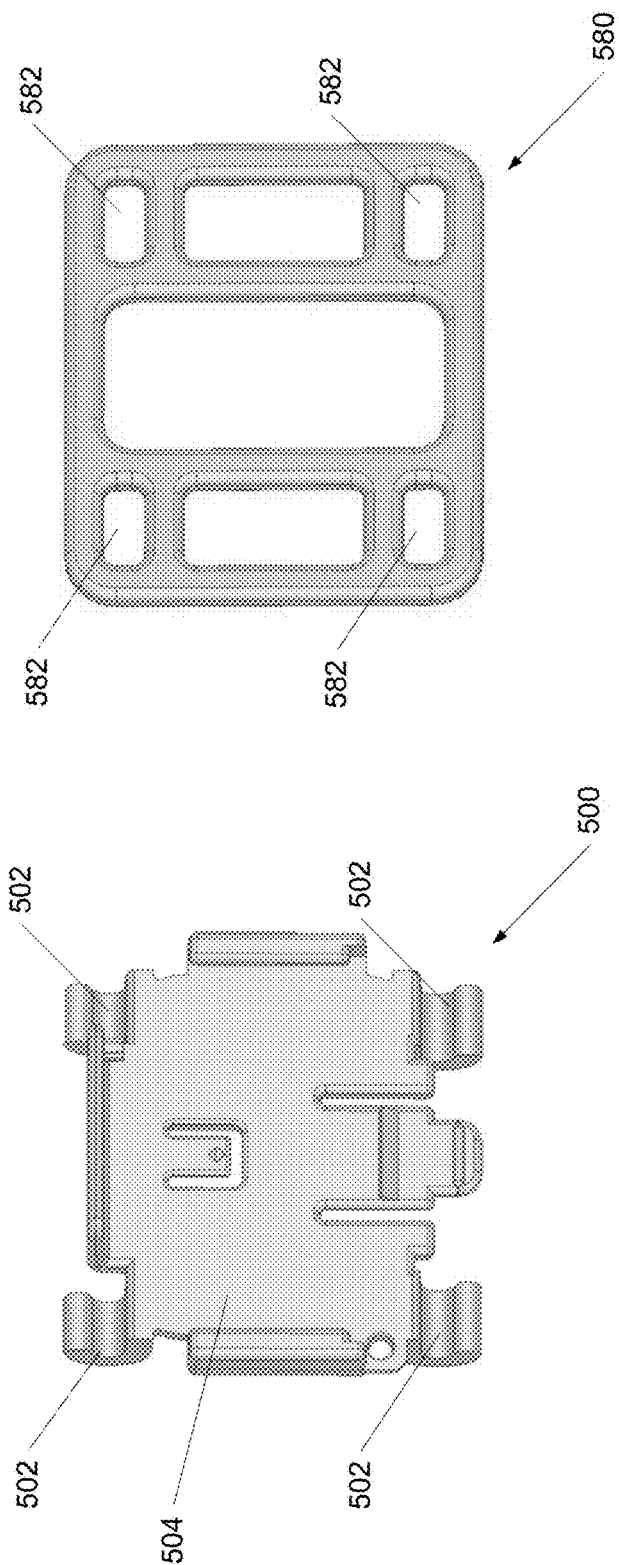
FIG. 5A and FIG. 5B are diagrams illustrating a mountable device and a retention assembly for mounting removable devices for tracking for an example embodiment.

A mountable device for use with a retention structure for an example embodiment is shown in FIG. 5A. In several embodiments, the mountable device 500 can include hooks 502 that are located at each corner of the mountable device. The mountable device can have a first side 504 that interfaces with a removable device as discussed above. A retention structure for attaching a mountable device for an example embodiment is shown in FIG. 5B. The retention structure 580 can include loops 582 that receive corresponding hooks 502 located on the mountable device. In many embodiments, the mountable device can be attached to a pet collar by placing the retention structure 580 on one side of the collar and the mountable device on the opposite side of the collar, where the hooks 502 attach to the loops 582 in securing the mountable device to the collar. Although specific structures for securing a mountable device to an object are discussed above with respect to FIG. 5A and FIG. 5B, any of a variety of structures for securing mountable devices as appropriate to the requirements of a specific application can be utilized for an example embodiment. Docking stations and removable devices utilizing primary and redundant retention devices for example embodiments n are discussed further below.

Docking Stations for Removable Devices

Figure 6:
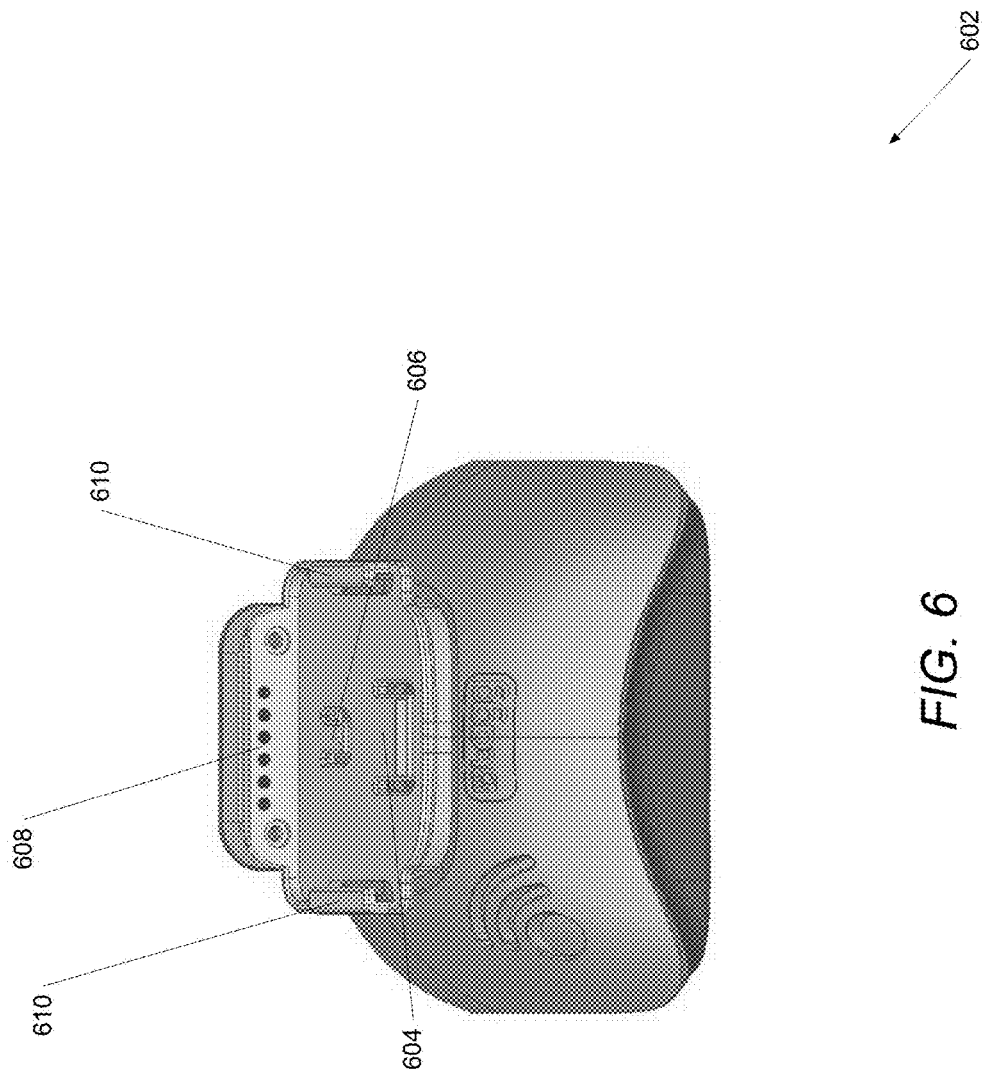
FIG. 6 is a diagram illustrating a docking station for an example embodiment.

Removable devices used for tracking (such as trackers) can attach to and detach from docking stations utilizing primary and redundant retention mechanisms. Docking stations utilizing primary and redundant retention mechanisms for example embodiments are illustrated in FIG. 6. In several embodiments, a docking station 602 can include a first fastening portion 604 and second fastening portion 606. In many embodiments, the fastening portions 602 and 604 along with corresponding fastening portions of a removable device can create the primary and redundant retention mechanisms as described above. In various embodiments, the docking station 602 can include an interface contact 608 that can be utilized to charge and/or exchange data with a docked tracker. In several embodiments, the docking station 602 can also include additional support structure 610 that corresponds to structure on the tracker for alignment and stability.

Although the present invention has been described in certain specific aspects, many additional modifications and variations would be apparent to those skilled in the art. It is therefore to be understood that the present invention may be practiced otherwise than specifically described. For example, latches, fasteners, pins, connectors, mounts, brackets, rings, plates, etc. can be used to attach the retention mechanisms. In addition, other devices or objects can be attached using primary and redundant retention mechanisms. Thus, embodiments of the present invention should be considered in all respects as illustrative and not restrictive.

What is claimed is:

1. An apparatus comprising:
   a first side comprising a first fastening portion and a second fastening portion;
   at the first fastening portion, a first groove for receiving an elongated body and engaging a first retention mechanism, the first retention mechanism for attaching a removable device to a mountable device; and
   at the second fastening portion, a second groove for receiving a circular body and engaging a second retention mechanism, the second retention mechanism attaching the removable device to the mountable device, independent of the first fastening portion.

2. The apparatus of claim 1, the first side further comprising a body groove between the first fastening portion and the second fastening portion.

3. The apparatus of claim 2, the body groove further comprising a decline face comprising a shallower end near the first fastening portion and a deeper end near the second fastening portion.

4. The apparatus of claim 3, wherein the body groove receives an inclined face of the mountable device.

5. The apparatus of claim 1, wherein the removable device may be removed from the mountable device only when both the first retention mechanism and the second retention mechanism are disengaged.

6. An apparatus comprising:
   a mountable device comprising a first side having a first fastening portion and a second fastening portion;
   at the first fastening portion, an elongated body having an inclined face parallel to and protruding from the first side and a flat face perpendicular to the first side;
   at the second fastening portion, a circular body with a smooth circular face, the circular body protruding from the first side;
   a removable device comprising a corresponding first side having a corresponding first fastening portion and a corresponding second fastening portion;
   at the corresponding first fastening portion, a first groove for receiving the elongated body and engaging a first retention mechanism; and
   at the corresponding second fastening portion, a second groove for receiving the circular body and engaging a second retention mechanism, independent of the first retention mechanism.

7. The apparatus of claim 6, the first fastening portion further comprising a tab, wherein the tab is flexible to allow the first fastening portion to move away from the mountable device.

8. The apparatus of claim 6, the mountable device further comprising four hooks, each hook of the four hooks located at a corner of the mountable device and protruding from a second side of the mountable device, wherein the hooks allow the mountable device to be attached to a pet collar using a retention structure for receiving the four hooks.

9. The apparatus of claim 6, wherein the second fastening portion is flexible to allow the second fastening portion to bend allowing the circular body to disengage from the removable device.

10. The apparatus of claim 6, the corresponding first side further comprising a body groove between the corresponding first fastening portion and the corresponding second fastening portion, the body groove comprising a decline face comprising a shallower end near the first fastening portion and a deeper end near the second fastening portion.

11. The apparatus of claim 6, wherein the removable device may be removed from the mountable device only when both the first retention mechanism and the second retention mechanism are disengaged.

* * * * *